United States Patent [19]  [11] 4,090,528
Hegemann  [45] May 23, 1978

[54] TRUSS ASSEMBLY STRUCTURE
[75] Inventor: Kenneth J. Hegemann, Ewa Beach, Hi.
[73] Assignee: Rainmatic International, Ltd., Honolulu, Hi.
[21] Appl. No.: 778,068
[22] Filed: Mar. 16, 1977
[51] Int. Cl.² .............................................. B05B 3/12
[52] U.S. Cl. ..................... 137/344; 239/177
[58] Field of Search ................ 137/344; 239/177, 212, 239/213

[56] References Cited
U.S. PATENT DOCUMENTS

| | | | |
|---|---|---|---|
| 3,566,911 | 3/1971 | Neier | 137/344 |
| 3,608,826 | 9/1971 | Reinke | 137/344 X |
| 3,851,659 | 12/1974 | Zimmerer et al. | 137/344 |
| 3,912,170 | 10/1975 | Reinke | 137/344 X |
| 3,946,946 | 3/1976 | Hansen et al. | 137/344 X |

Primary Examiner—Alan Cohan
Assistant Examiner—Gerald A. Michalsky
Attorney, Agent, or Firm—Merriam, Marshall & Bicknell

[57] ABSTRACT

Improved apparatus for supporting the pipeline of a center pivot irrigation system between adjacent mobile tower assemblies adapted to transport the pipeline over uneven terrain. The improved apparatus includes means for coupling a triangularly-shaped truss to the pipeline and establishing a fulcrum at an intermediate point on the truss side members to equalize the forces applied to the truss side members as the pipeline is transported over uneven terrain.

4 Claims, 4 Drawing Figures

TRUSS ASSEMBLY STRUCTURE

BACKGROUND OF THE INVENTION

The present invention relates generally to improved apparatus for a center pivot irrigation system and more particularly to improved apparatus for equalizing the forces resulting on truss members supporting the system pipeline between mobile tower assemblies transporting the pipeline across uneven terrain.

Center pivot irrigation systems and equipment, such as that described in my copending United States patent application, Ser. No. 778,069, filed Mar. 16, 1977, generally comprise a plurality of water sprinklers mounted along the length of a series of coupled pipe sections which, in turn, are transported on a plurality of mobile tower assemblies. Water is pumped through the connected pipe sections, and water is sprayed onto the field through the sprinklers as the mobile tower assemblies with the pipes supported thereon rotate about the center pivot point. The pipeline, in many instances, extends up to one-half mile in length, and accordingly, when the pipeline is rotated about the center pivot point on the mobile tower assemblies, the system is capable of irrigating fields approximately one mile or less in diameter.

In order to minimize crop damage by the supportive tower assemblies, the assemblies are spaced at wide intervals along the pipeline. Because of the large quantities of water required for irrigation and the resulting weight associated therewith, however, additional apparatus is usually provided to support the pipeline between adjacent tower assemblies. Such apparatus commonly includes a series of triangularly-shaped trusses attached to the pipeline, for example, by bolting to a mounting bracket welded to the pipeline, and supported beneath the pipeline by underslung support members such as rods or cables extending between adjacent tower assemblies. As water is transported through the pipeline, the pipeline bears downwardly on the trusses which, in combination with the support means, support the pipeline between the tower assemblies. Such supportive apparatus increases the load bearing capabilities of the pipeline, permits the use of large diameter pipeline, and in addition, the tower assemblies can be spaced farther apart than would otherwise be possible.

One problem associated with the above described arrangement, however, is that the forces exerted on the truss members by the pipeline become unbalanced when the pipeline is transported over uneven terrain. In particular, when the tower assemblies are moving across substantially level ground, the support rods and the trusses are vertically symmetrical with respect to the pipeline, and the forces resulting on the two slanting side members of each particularly triangularly-shaped truss are substantially equal. However, as the tower assemblies follow the contours of the land and climb or descend sloped terrain, as the case may be, the support rods and the trusses tend to be correspondingly displaced or swung from their normal vertically symmetrical position with respect to the pipeline. This causes an imbalance between the forces bearing on the side members of the truss with a greater force being brought to bear on one side member than on the other side member. In certain cases, this may result in excessive stress being put on one or more of the truss members sufficient to damage the system.

Heretofore, in order to equalize the forces on the truss side members, a rigid horizontal cross member connecting the side members at an intermediate point along their lengths has been included. Typically, the intermediate cross member is located parallel to and above the bottom horizontal truss member and spaced downwardly from the pipeline. The intermediate horizontal member serves to establish fulcrums at the intermediate contact points on the side members. Thus, when the pipeline is being transported uphill, for example, a strong force in the direction opposite to the direction of travel of the apparatus is applied to the bottom end of the forwardly disposed side member by the rearwardly disposed side member through the horizontal bottom member of the triangularly-shaped truss. The fulcrum established at the forward member by the intermediate horizontal truss member causes the resultant force applied to the pipeline at the other end of the forward side member to be in a forward direction thereby tending to return the support apparatus to its normal vertically symmetrical position with respect to the pipeline and equalize the forces applied to the side members.

Conversely, if the apparatus is moving downhill, the force applied to the pipeline by the rearwardly-disposed side member acting through the fulcrum is in the opposite or clockwise direction, i.e., toward the rear, causing the support apparatus to tend to return to its generally substantially upright position and thus neutralizing the force imbalance on the side truss members.

Installation of the intermediate horizontal cross member on each one of the many trusses required for a single center pivot irrigation system, however, greatly increases the material costs of the system as well as the labor costs associated with fastening the members to the trusses and welding the trusses to the pipeline. Further, the gross weight of the system is increased significantly and may result, in extreme cases, in one or more of the mobile tower assemblies becoming mired in mud or wet sandy soil as the system trasverses an already partially irrigated field.

SUMMARY OF THE INVENTION

In accordance with the principles of the present invention, improved apparatus for supporting a pipeline between adjacent mobile tower assemblies of a center pivot irrigation system as the pipeline is transported over uneven terrain is hereinafter described and claimed.

In particular, the improved apparatus comprises a pair of support members extending between the tower assemblies to support a triangularly-shaped truss. The truss includes a generally horizontal bottom member coupled to and extending between the support members and further includes first and second side member means which are coupled to the bottom member and slant inwardly and upwardly to the pipeline. Each of the side member means of the truss are coupled to the pipeline by coupling means comprising a bracket which includes a horizontal member attached to the underside of the pipeline and extending outwardly beyond the pipeline and a slanted side member having one end coupled to and integral with the corresponding outwardly extending end of the horizontal member and its other end attached to the pipeline on the side thereof. The coupling means further includes means for fastening the truss side members to the corresponding slanted coupling side members so that, unlike prior art apparatus, each of the truss side members extends beyond the coupling member to contact the pipeline. The coupling means establishes a fulcrum at a corresponding intermediate point along the length of each of the truss side members to equalize the forces applied to the truss members as the pipeline is transported over uneven terrain.

By utilizing the improved coupling means of the present invention, the intermediate horizontal cross member can be eliminated with attendant advantages realized in material and labor cost savings.

BRIEF DESCRIPTION OF THE DRAWINGS

The features of this invention which are believed to be novel are set forth with particularity in the appended claims. The invention together with its further objects and advantages thereof may be best understood by reference to the following description taken in conjunction with the accompanying drawings, in which like reference numerals identify like elements in the several figures and in which:

DETAILED DESCRIPTION OF THE DRAWINGS

Although the improved apparatus of the present invention may be advantageously used in the center pivot irrigation system described in my copending U.S. patent application, Ser. No. 778,069, filed Mar. 16, 1977, it should be understood that the improved apparatus of the present invention is not limited to use with the particular system described therein, but may be adapted for use with other center pivot irrigation systems as well.

With reference now generally to FIGS. 1-4, inclusive, the relevant portions of the apparatus comprising a center pivot irrigation system and the improved pipeline support apparatus of the present invention are hereinafter described.

Figure 1:
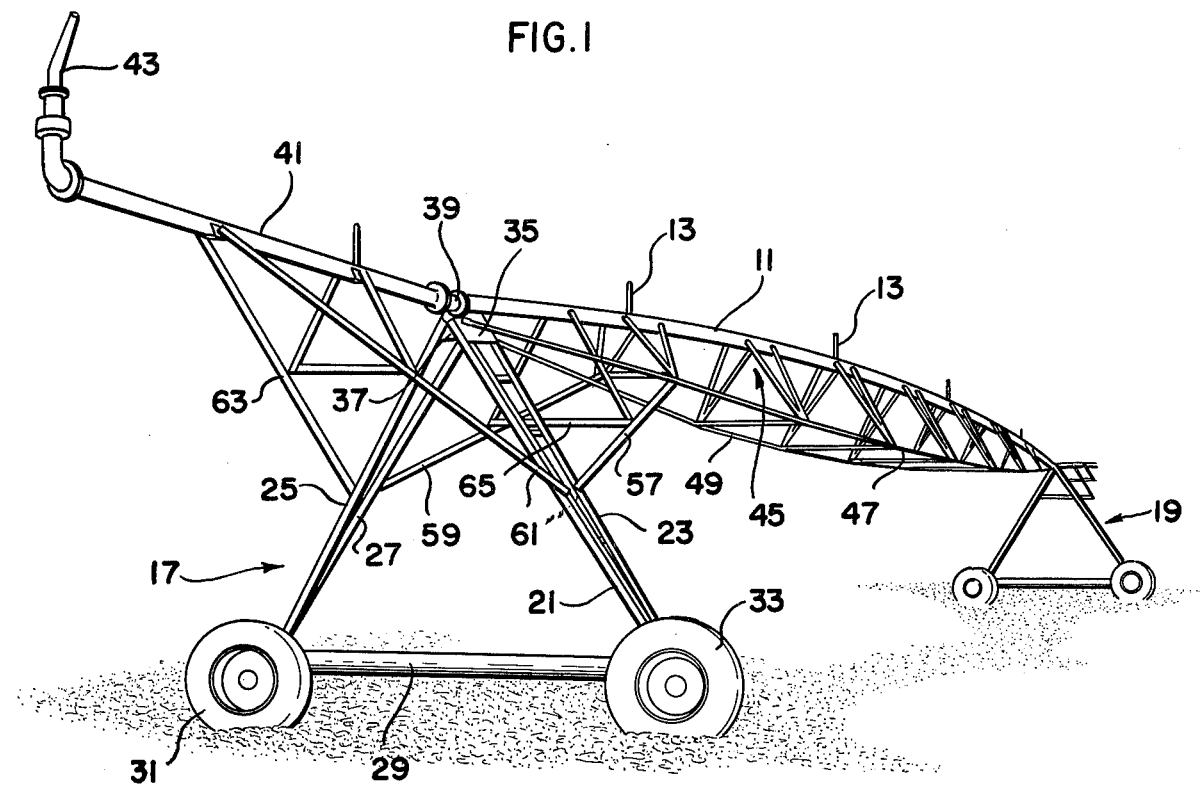
FIG. 1 is a partial perspective view of a center pivot irrigation system showing the outermost sections of the pipeline supported between adjacent tower assemblies and illustrating improved pipeline support apparatus.

In FIG. 1, a pipeline 11 having a plurality of sprinklers 13 spaced at intervals along its length for spraying water onto the field is supported between a pair of adjacent tower assemblies, identified generally at 17 and 19. Because the tower assemblies 17 and 19 are substantially identical, however, only tower 17 will be described in detail.

More particularly, tower assembly 17 comprises front and rear pairs of angle iron leg members 21, 23, 25, and 27. The bottom ends of leg members 21 and 23 angle toward each other and are fastened to a horizontal tubular frame member 29, and similarly, the other pair of leg members 25 and 27 are also angled together at their bottom ends and are coupled to the other ends of tubular member 29. A pair of wheels 31 and 33 driven by a wheel drive mechanism (not shown) are mounted to the assembly at opposite ends of the tubular member 29 support and transport the tower assembly thereon around the center pivot point. Leg members 21 and 23 flare apart and are connected at their top ends to a mounting plate 35, while leg members 25 and 27 similarly flare apart at their top ends and are connected to a second mounting plate 37. As shown in FIG. 1, the leg member pairs slant inwardly and meet at their respective mounting plates 35 and 37. The mounting plates 35 and 37, in turn, are welded or otherwise affixed to the pipeline section 11.

A coupling member 39 couples an end pipe section 41 to the outer end of the pipeline section 11. The end pipe section 41 extends outwardly from the outermost tower assembly 17 and terminates with an end sprinkler jet or gun assembly 43 which is directed outwardly to increase the effective coverage of the apparatus.

Figure 2:
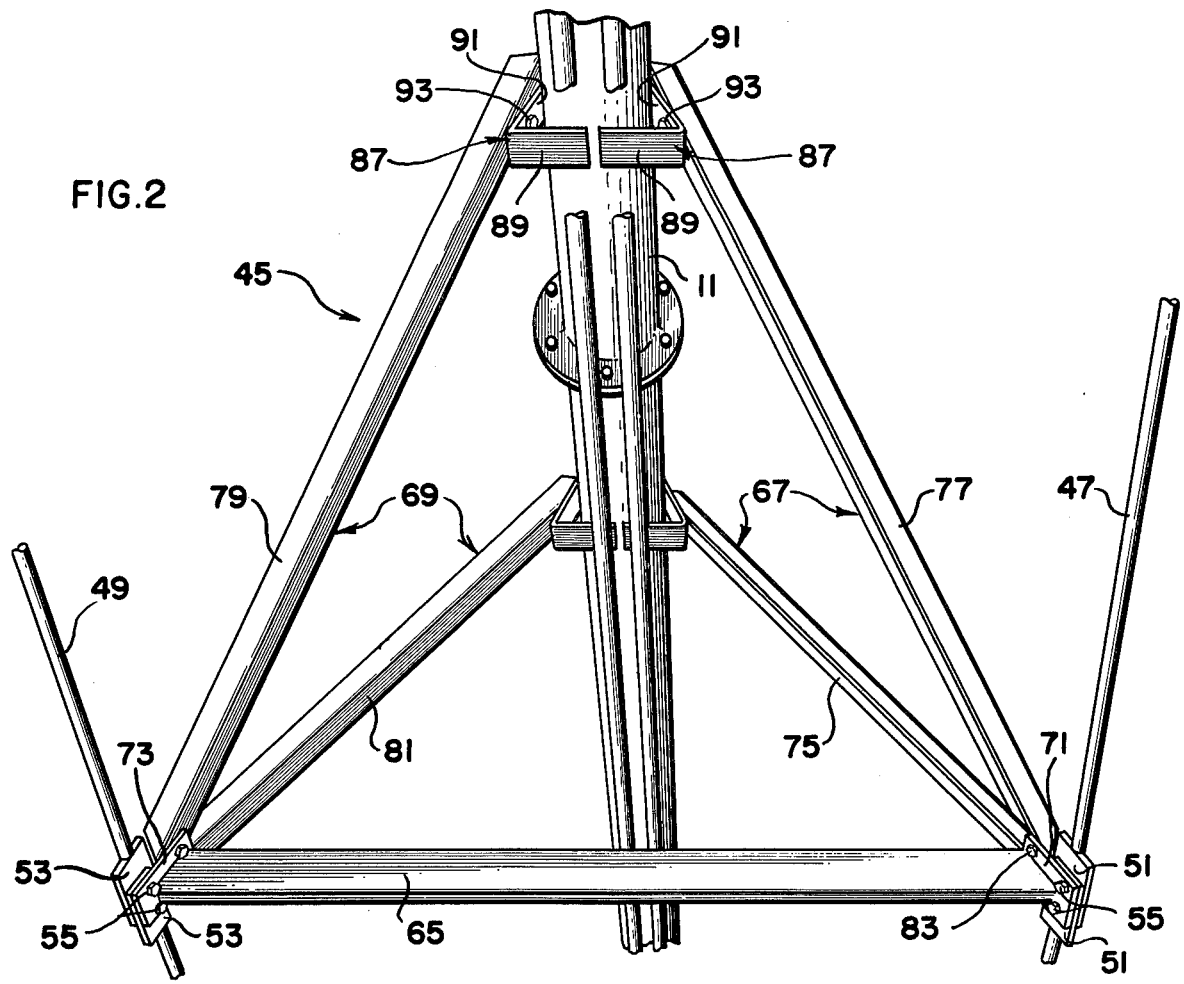
FIG. 2 is a fragmentary perspective view of the improved pipeline support apparatus as viewed from below.
Figure 3:
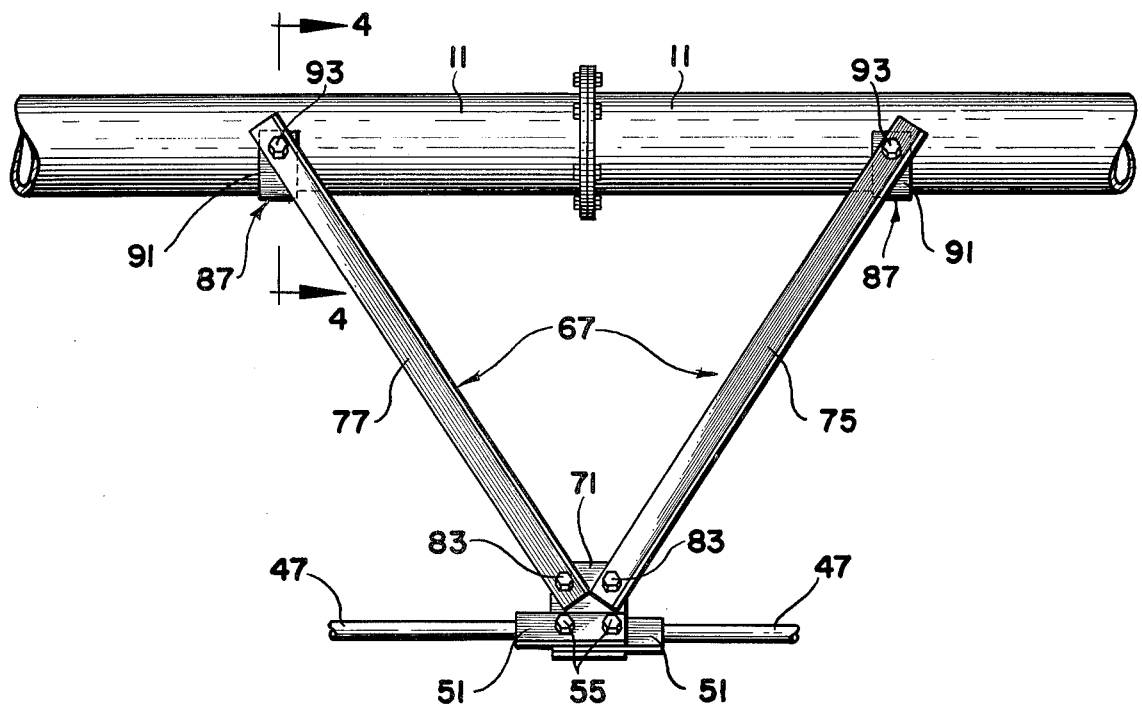
FIG. 3 is a partial side elevational view of the improved support apparatus; and, FIG. 4 is a sectional view of the improved support apparatus taken along lines 4—4 in FIG. 3.
Figure 4:
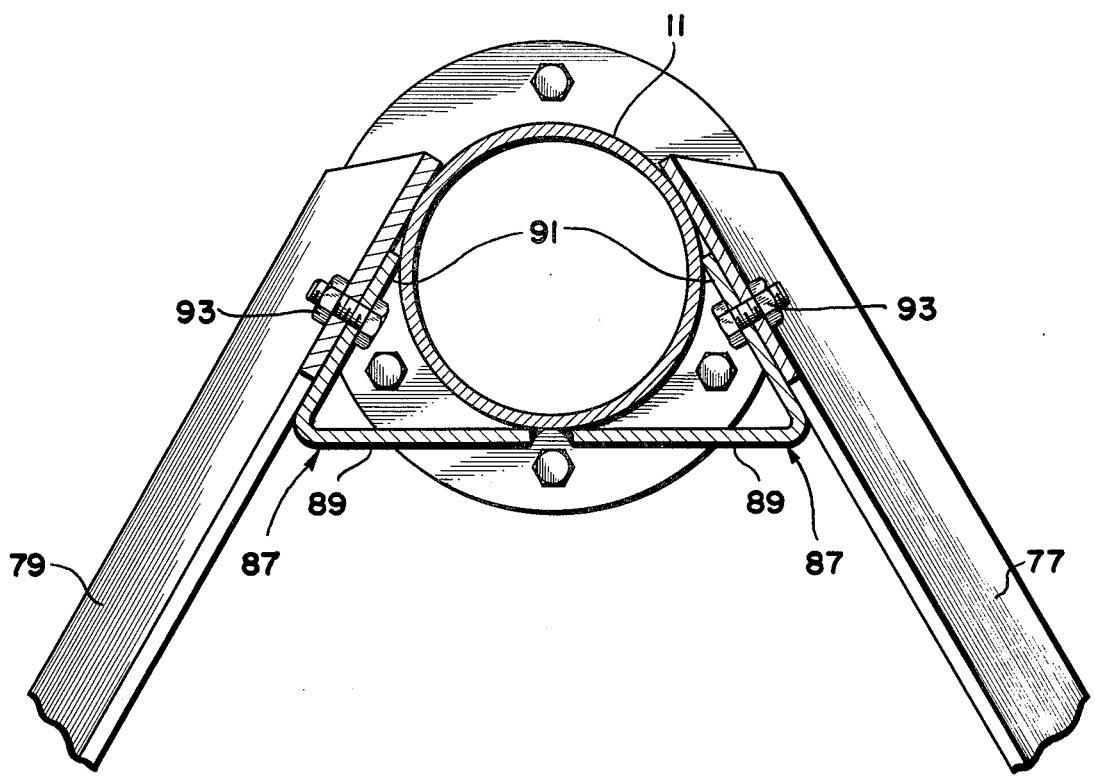

In accordance with the present invention, improved pipeline support apparatus is provided for supporting the pipeline 11 between adjacent tower assemblies such as those shown at 17 and 19. Referring now also to FIGS. 2-4, inclusive, the improved support apparatus may be seen to comprise a plurality of trusses, identified generally at 45, which are mounted to the pipeline 11 and supported beneath the pipeline 11 by a pair of underslung support members 47 and 49 extending between the adjacent tower assemblies 17 and 19.

In the present embodiment, each of the support members 47 and 49 comprises several lengths of steel rod fastened together to form a single support rod. In other embodiments, however, cables or the like may be used. Plates 51 are welded to both ends of each rod comprising support member 47 while plates 53 are similarly attached to both ends of each rod combining to form support member 49. The plates 51 at the corresponding ends of adjacent rods are overlapped and fastened together, for example, by bolts 55 to form the support member 47, and the plates 53 are fastened together to form support member 49. At the tower assembly 17, the plates 51 and 53 at the ends of the assembled rods 47 and 49, respectively, are bolted or otherwise affixed to the mounting plates 35 and 37, respectively. The other ends of support members 47 and 49 are similarly fastened to tower assembly 19 to extend between the tower assemblies 17 and 19.

A pair of braces 57 and 59 (FIG. 1) attached at corresponding intermediate points along leg members 23 and 27, respectively, angle upwardly and are fastened to the truss support rods 47 and 49 to lend support thereto. Identical bracing is provided at tower assembly 19 to brace the support rods 47 and 49 at that end. In similar fashion, a pair of brace members 61 and 63 attach to leg members 21 and 25, respectively, at corresponding intermediate points therealong and angle upward to attach to the end pipe section 41 at an intermediate point along its length to support the end pipe section 41 which extends outwardly beyond the tower assembly 17.

A plurality of the triangularly-shaped truss members 45 are borne by the support members 47 and 49 and are mounted to the pipeline 11 at spaced intervals. As may be seen in FIGS. 2 and 4, the truss 45 is symmetrically disposed in the vertical direction about the pipeline 11. Specifically, each truss member 45 comprises a horizontal bottom member 65 which extends between and is attached to the underslung support rods 47 and 49 and a pair of side member apparatus 67 and 69 which extend upwardly to the pipeline 11. Mounting plates 71 and 73 which are welded or otherwise affixed to opposite ends of the horizontal bottom member 65 are fastened to the plates 51 and 53 respectively, by the same bolts 55 which used to fasten the plates 51 together and the plates 53 together. In the present embodiment, the truss side member apparatus 67 comprises a pair of angle iron braces 75 and 77 while the truss side member apparatus 69 comprises angle iron braces 79 and 81. The braces 75 and 77 are fastened to the mounting plate 71 at one end of the horizontal bottom truss member 65 by bolts 83, and the braces 79 and 81 are attached to the mounting plate 73 at the other end of bottom member 65 by bolts 85. The truss side braces 75, 77, 79, 81 slant inwardly and upwardly toward the pipeline 11 and flare outwardly longitudinally along the pipeline 11 at their top ends to engage the pipeline at spaced points therealong and impart greater longitudinal stability to the support apparatus.

At their respective top ends, the brace members 75, 77 and 79, 81 of the truss side member apparatus 67 and 69, respectively, are aligned with corresponding brackets 87 welded to the pipeline 11. In particular, each bracket 87 comprises a substantially horizontal member portion 89 welded at one end to the bottom of the pipeline 11 and an integral side member portion 91 at the other end of the horizontal member portion 89. The side member portion 91 is angularly disposed backwardly with respect to the horizontal portion 89 to contact the pipeline at a point generally along the side of the pipeline 11. At that point, the folded back side member portion 91 is welded to the pipeline 11 to provide an integral mounting bracket 87 for the braces 75, 77, 79, 81, which are fastened thereto by bolts 93.

In accordance with the principles of the present invention, each of the braces 75, 77, 79, 81, projects beyond the upper end of the corresponding bracket side member 91 to contact the pipeline 11 for a distance along the upper half of the pipeline 11. This maximizes the contact between the brace and the pipeline while maximizing the distance between the point at which the brace contacts the pipeline and the fulcrum provided by bolt 93 thereby increasing the force equalizing characteristics of the assembly.

In operation, the brackets 87, mount the trusses 45 to the pipeline 11 to equalize the forces applied to the truss side member apparatus 67 and 69 as the pipeline 11 is transported over uneven terrain. More particularly, the brackets 87 establish a fulcrum at an intermediate point along each of the braces 75, 77, 79, 81. Accordingly, when greater force is exerted on the braces on one side, for example, as when the pipeline 11 is being transported uphill or downhill, the brackets 87 by which the braces on the other side are attached to the pipeline 11 act as fulcrums to translate the force applied to the bottom ends of the braces on the other side by the horizontal bottom member 65 into counterbalancing forces applied to the pipeline 11 by the top ends of the braces. The resulting counterbalancing forces applied to the pipeline tend to swing the support apparatus and the pipeline to a position where the support apparatus is vertically symmetrical with respect to the pipeline 11, thereby equalizing the forces resulting on the truss members while eliminating the horizontal intermediate truss member theretofore provided.

While a particular embodiment of the present invention has been shown and described, it will be obvious to those skilled in the art that various changes and modifications may be made without departing from the invention in its broader aspects. Accordingly, the aim in the appended claims is to cover all such changes and modifications as may fall within the true spirit and scope of the invention.

What is claimed is:

1. Improved apparatus in a center pivot irrigation system for supporting a pipeline between adjacent tower assemblies adapted to transport the pipeline over uneven terrain, the improved apparatus comprising:
a pair of support members extending between the tower assemblies;
a triangularly-shaped truss including a generally horizontal bottom member coupled to and extending between the support members and further including first and second side members coupled to the bottom member and slanting inwardly and upwardly to the pipeline; and
means for coupling the truss side members to the pipeline, the coupling means including horizontal member means attached to the pipeline on the underside thereof and extending outwardly in opposite directions beyond the pipeline and further including side members having one end coupled to and integral with a corresponding outwardly extending end of the horizontal member means, each of the coupling side members having another end attached to the pipeline on opposite sides thereof, the coupling means including means for fastening the truss side members to the corresponding coupling side members, each of the truss side members extending beyond the end of the corresponding coupling side member to contact the pipeline, the coupling means establishing a flucrum at a corresponding intermediate point along the length of each of the truss side members to equalize the forces applied to the truss members as the pipeline is transported over uneven terrain.

2. Improved apparatus in accordance with claim 1 wherein the coupling means comprises a plurality of first and second brackets attached to the pipeline on opposite sides thereof, each of the brackets having a horizontal portion attached to the underside of the pipeline and extending outwardly beyond the pipeline perpendicularly thereto, each of the brackets further having a side portion integrally coupled to and slanting inwardly toward the pipeline from the outward end of the horizontal portion, the other end of the side portion being coupled to the side of the pipeline, and wherein each of the truss side members comprises first and second braces, the first and second braces being angled to couple to the horizontal truss bottom member at one end and having respective other ends coupled to corresponding pairs of first and second brackets spaced along the pipeline, said braces extending beyond said corresponding brackets to contact and pipeline.

3. Improved apparatus in accordance with claim 1 wherein the support members comprise a pair of rods each of the rods comprising a plurality of interconnected rod sections, each of the rod sections having plate means at both ends and fastening means for interconnecting the rod sections, and wherein the horizontal truss bottom member includes plate means at both ends adjacent the plate means of the rod sections, the fastening means further mounting the horizontal truss bottom member plate means to the rod plate means to couple the horizontal truss bottom member between the rods.

4. Improved apparatus in accordance with claim 3 including means for fastening one end of each truss side member to the plate means at the corresponding end of the horizontal truss bottom member.

* * * * *